Patented Aug. 28, 1928.

1,682,729

UNITED STATES PATENT OFFICE.

WILLIAM P. ter HORST, OF AKRON, OHIO, ASSIGNOR TO THE RUBBER SERVICE LABORATORIES COMPANY, OF AKRON, OHIO, A CORPORATION OF OHIO.

VULCANIZED RUBBER PRODUCT AND METHOD OF PRODUCING SAME.

No Drawing.   Application filed August 4, 1927.   Serial No. 210,713.

The present invention relates to the manufacture of vulcanized rubber by a process wherein there is employed as an accelerator of the vulcanization step, products obtained by the reaction of amines upon the thiophosgene and like derivatives of the mercapto thiazoles and analogous compounds. The manufacture of the preferred class of accelerating compounds and their use in a rubber mix will be readily understood from the following description and examples.

Mercapto-aryl-thiazole compounds and the metallic salts of such compounds heretofore have been described as providing a class of vulcanization accelerators capable of imparting certain desirable properties to a rubber mix and furthermore capable of producing such a rubber product in a relatively short vulcanization period. It has now been found that a rubber product possessing greatly enhanced properties results after an equally short vulcanization period by replacing mercapto-benzo-thiazole or its metallic salts with certain reaction products thereof of a type hereinafter set forth.

The products comprising the subject-matter of the present invention include the vulcanization accelerating compounds obtained by treating the thiophosgene and analogous derivatives of mercapto-aryl-thiazoles and their metallic salts with amines and preferably with aliphatic amines. One example of such an accelerator is the compound resulting from treating the thiophosgene reaction product of the sodium salt of mercapto-benzo-thiazole with piperidine. Such a product is readily manufactured in the following manner.

The sodium salt of mercapto-benzo-thiazole, obtained preferably by dissolving substantially 167 parts (one molecular proportion) of mercapto-benzo-thiazole in an alkaline solution containing slightly more than an equivalent molecular proportion of caustic soda, was treated with approximately 115 parts (one molecular proportion) of thiophosgene by passing the thiophosgene at a relatively slow rate beneath the surface of the solution while agitating. A yellow precipitate resulted. The reaction involved is an exothermic change and since heat was developed, cooling means should be provided to prevent the reacting mass from overheating. If the thiophosgene is run into the thiazole solution sufficiently slowly, however, the speed of the reaction is thereby controlled and no cooling of the mass is necessary.

After the reaction was completed, the resulting product was filtered and the precipitate washed with dilute caustic soda solution and then dried, preferably in a vacuum. The thiophosgene reaction product of sodium mercapto-benzo-thiazole, obtained as described, melts at from about 106 to 112° C. This product can be purified if desired by crystallization from chloroform.

In a similar manner, di-thiazyl-tri-thiocarbonate was obtained by reacting thiophosgen with sodium mercapto-benzo-thiazole in the ratio of one molecular proportion of the former to two molecular proportions of the latter. Similarly, sulphur-chloride, per-chlor-methyl-mercaptan $(CSCl_4)$ and other compounds preferably containing two replaceable halogen atoms attached to carbon or sulphur have been reacted with various mercapto thiazole compounds, such as sodium mercapto benzo or tolyl thiazoles and the like to produce reaction products of the type specifically described in the example hereinbefore set forth in detail.

The various reaction products described have been found to possess the characteristic of accelerating the vulcanization of rubber mixes but their activity and commercial usefulness in this particular are greatly increased by further treatment of the reaction products described with organic derivatives of ammonia particularly the amines, for example, piperidine, diphenyl-guanidine and other primary and secondary amines and amino derivatives, preferably of the aliphatic series, such as aldehyde ammonia, piperazine, the biguanides, tetra-methyl ammonium hydroxide, ethylamine, di-ethylamine and homologous amino compounds.

The piperidine derivative of the reaction products of the type of compounds hereinbefore mentioned was obtained by treating approximately one molecular proportion of the thiophosgene reaction product of sodium mercapto-benzo-thiazole with somewhat more than an equi-molecular proportion of piperidine while agitating. The reaction that took place was an exothermic change and the ingredients were added preferably at such a rate that the temperature of the mass was maintained during the course of the reaction at from 70 to 80° C. After all the reaction product of the sodium salt of mercapto-benzo-thiazole with thiophosgene had been added to the piperidine, the mass was allowed to stand for a period of time to permit the reaction to be completed, whereupon the syrup like product was washed with water to remove unchanged piperidine and any other soluble products present and the insoluble residuum was then dried in any suitable manner, preferably under a vacuum. The reaction product comprising the combination of substantially equi-molecular proportions of the ingredients employed is soluble in terpene hydrocarbons and may be used if desired in solution in a solvent of that form, but preferably the product is employed without such solvent.

Other amines have been employed in place of piperidine in the reaction set forth above. Thus, piperidine has been reacted upon the product obtained by the union of per-chlormethyl-mercaptan and sodium mercapto-benzo-thiazole; diphenyl-guanidine has been reacted with an equal weight and also in the proportion of from one-half to two mols of the guanidine to approximately one mol of the thiophosgene reaction product of sodium mercapto-benzo-thiazole. Other organic derivatives of ammonia likewise combine with the reaction products of other mercapto aryl thiazole compounds with thiophosgene and the like to produce vulcanization accelerators of the type set forth.

The utility of the various amino derivatives of the reaction product of thiophosgene and like compounds with mercapto thiazoles is illustrated by the following examples of the invention as claimed herein. In these examples, compounds of the preferred type are employed as accelerators in the vulcanization of typical rubber stocks. Thus, various rubber mixes were prepared in the ordinary manner comprising.

100 parts of pale crepe rubber,
5 parts of zinc oxide,
3.5 parts of sulphur, and
0.5 parts of accelerator.

As accelerators there were employed the various products indicated in the tables given below. The various stocks so obtained were then vulcanized by heating the samples in a press and then testing the samples which had been vulcanized under the conditions indicated. The physical characteristics of the vulcanized stocks were found to be as follows:

| Accelerator | Time of cure | Modulus of elasticity in lbs. per sq. inch at elongation of— | | | Tensile at break in lbs/in² | % ultimate elongation |
| --- | --- | --- | --- | --- | --- | --- |
| | | 300% | 500% | 700% | | |
| Mercapto-benzo-thiazole. | 30 minutes at 20 lbs. steam. | 96 | 225 | 906 | 2605 | 895 |
| | 1 hour at 20 lbs. steam. | 162 | 350 | 1365 | 3160 | 845 |
| | 30 minutes at 40 lbs. steam. | 163 | 340 | 1245 | 2950 | 840 |
| | 1 hour at 40 lbs. steam. | 157 | 339 | 1060 | 2990 | 865 |
| Piperidine derivative of the reaction product of thiophosgene and sodium mercapto-benzo-thiazole. | 30 minutes at 20 lbs. steam. | 315 | 809 | 3400 | 4640 | 770 |
| | 1 hour at 20 lbs. steam. | 308 | 808 | 3325 | 4510 | 760 |
| | 30 minutes at 40 lbs. steam. | 262 | 585 | 2370 | 4205 | 820 |
| | 1 hour at 40 lbs. steam. | 236 | 544 | 1950 | 4040 | 825 |
| Piperidine derivative of the reaction product of per-chlor-methyl-mercaptan with sodium mercapto-benzo-thiazole. | 30 minutes at 20 lbs. steam. | 121 | 272 | 1065 | 2790 | 865 |
| | 1 hour at 20 lbs. steam. | 157 | 406 | 1715 | 3300 | 835 |
| | 30 minutes at 40 lbs. steam. | 159 | 355 | 1495 | 3450 | 835 |
| | 1 hour at 40 lbs. steam. | 172 | 380 | 1520 | 3295 | 830 |

| Accelerator | Time of cure | Modulus of elasticity in lbs. per sq. inch at elongation of— | | | Tensile at break in lbs/in² | % ultimate elongation |
| --- | --- | --- | --- | --- | --- | --- |
| | | 300% | 500% | 700% | | |
| Di-phenyl guanidine. | 30 minutes at 20 lbs. steam. | 41 | 59 | 126 | 865 | 1145 |
| | 1 hour at 20 lbs. steam. | 83 | 149 | 327 | 1460 | 980 |
| | 30 minutes at 40 lbs. steam. | 130 | 262 | 765 | 2590 | 905 |
| | 1 hour at 40 lbs. steam. | 184 | 378 | 1513 | 3365 | 825 |
| Reaction product of substantially equal weights of di-phenyl-guanidine and the thiophosgene product of sodium mercapto-benzo-thiazole. | 30 minutes at 20 lbs. steam. | 112 | 303 | 854 | 3100 | 925 |
| | 1 hour at 20 lbs. steam. | 172 | 365 | 1435 | 3690 | 875 |
| | 30 minutes at 40 lbs. steam. | 198 | 406 | 1545 | 3800 | 865 |
| | 1 hour at 40 lbs. steam. | 192 | 406 | 1455 | 3450 | 845 |
| Reaction product of substantially equi-molecular proportions of di-phenyl-guanidine and the thiophosgene product of sodium mercapto-benzo-thiazole. | 30 minutes at 20 lbs. steam. | 123 | 249 | 953 | 2845 | 900 |
| | 1 hour at 20 lbs. steam. | 198 | 426 | 1675 | 3720 | 830 |
| | 30 minutes at 40 lbs. steam. | 200 | 403 | 1540 | 3850 | 865 |
| | 1 hour at 40 lbs. steam. | 203 | 408 | 1585 | 3815 | 845 |

| Accelerator | Time of cure | Modulus of elasticity in lbs. per sq. inch at elongation of— | | | Tensile at break in lbs/in² | % ultimate elongation |
|---|---|---|---|---|---|---|
| | | 300% | 500% | 700% | | |
| Reaction product of 1 molecular proportion of diphenyl-guanidine with substantially 2 molecular proportions of the thiophosgene product of sodium mercapto-benzo-thiazole | 30 minutes at 20 lbs. steam. | 142 | 334 | 1055 | 2675 | 860 |
| | 1 hour at 20 lbs. steam. | 182 | 377 | 1530 | 3545 | 855 |
| | 30 minutes at 40 lbs. steam. | 177 | 379 | 1410 | 3475 | 850 |
| | 1 hour at 40 lbs. steam. | 197 | 400 | 1390 | 3295 | 850 |

The above results show that the accelerators of the type herein claimed, that is, the amine derivatives of the reaction product of thiophosgene with a mercapto-aryl-thiazole, produce vulcanized rubber at all conditions of cure possessing a higher quality than do such commonly known accelerators as diphenyl-guanidine or mercapto-benzo-thiazole. This superiority is particularly shown by those cures carried out under the lower temperature conditions.

A high grade tread stock was manufactured by the well known compounding methods comprising a mixture of
  36.5 parts of smoked sheet rubber,
  20 parts of No. 2 amber rubber,
  11 parts of zinc oxide,
  25 parts of carbon black,
  3.5 parts of mineral rubber,
    1 part of a blended mineral and vegetable oil,
  2 parts of sulphur,
  0.5 parts accelerator.

The accelerating power of mercapto-benzo-thiazole was compared with the piperidine derivative of the reaction product of thiophosgene with sodium mercapto-benzo-thiazole by preparing two stocks containing the indicated proportions of the respective accelerators. The vulcanized rubber samples were then tested and the following results obtained:

| Accelerator | Time of cure | Modulus of elasticity at elongations of— | | | Tensile at break | Ultimate elongation |
|---|---|---|---|---|---|---|
| | | 300% | 500% | 700% | | |
| Mercapto-benzo-thiazole. | 1 hour at 40 lbs. steam. | 1205 | 2725 | ----- | 3585 | 605% |
| | 1½ hours at 40 lbs. steam. | 1205 | 2655 | ----- | 3340 | 580% |
| Piperidine derivative of the thiophosgene reaction product of sodium mercapto-benzo-thiazole. | 1 hour at 40 lbs. steam. | 1605 | 3510 | ----- | 3980 | 555% |
| | 1½ hours at 40 lbs. steam. | 1565 | 3375 | ----- | 3610 | 540% |

The above results show that the new accelerators of the type set forth herein are superior in accelerating characteristics to mercapto-benzo-thiazole when these accelerators are employed in a typical high grade tread stock.

A rubber stock containing a high percentage of zinc oxide was prepared in the usual manner, which stock comprised:
  100 parts of pale crepe rubber,
  15 parts of zinc oxide,
  3.5 parts of sulphur,
  0.5 parts accelerator.

As accelerators there were employed mercapto-benzo-thiazole and one of my new type of accelerators as hereinbefore set forth. The stocks were then vulcanized and tested and the following results obtained:

| Accelerator | Time of cure | Modulus of elasticity at elongations of— | | | Tensile at break | Ultimate elongation |
|---|---|---|---|---|---|---|
| | | 300% | 500% | 700% | | |
| Mercapto-benzo-thiazole. | 30 minutes at 40 lbs. steam. | 153 | 313 | 835 | 2590 | 910% |
| | 1 hour at 40 lbs. steam. | 173 | 346 | 930 | 2940 | 900% |
| | 1½ hours at 40 lbs. steam. | 158 | 319 | 743 | 2830 | 935% |
| Piperidine derivative of the reaction product of thiophosgene with sodium mercapto-benzo-thiazole. | 30 minutes at 40 lbs. steam. | 255 | 590 | 2365 | 4005 | 805% |
| | 1 hour at 40 lbs. steam. | 261 | 607 | 2275 | 3690 | 795% |
| | 1½ hours at 40 lbs. steam. | 249 | 530 | 2030 | 3770 | 825% |

The data set forth shows that the accelerator of the preferred type as herein disclosed possesses excellent accelerating power through a wide range of cures and is superior in both particulars to mercapto-benzo-thiazole when employed in a high zinc oxide stock.

A hard rubber was manufactured by compounding the following mix:
  20 parts smoked sheet rubber,
  20 parts No. 2 amber rubber,
  5 parts lime,
  17.5 parts zinc oxide,
  27.5 parts sulphur,
  10 parts mineral rubber,
  0.5 parts of the piperidine reaction product of the thiophosgene derivative of sodium mercapto-benzo-thiazole.

It was found that an excellent hard rubber product was produced when the above stock was vulcanized by heating for approximately two hours and forty-five minutes in a press maintained at a temperature of 287° F.

Other tests have also been carried out in which accelerators of the preferred type hereinbefore set forth have been employed in rubber stocks containing organic dyes for the production of colored vulcanized products. It was found that the accelerators did not impair the action of the dye upon the rubber nor affect the color of the rubber articles.

The various examples hereinbefore set forth are to be understood as illustrative only and not at all limitative of the scope of my invention. Other examples of various types of rubber compounds wherein different proportions of the compounding ingredients employed or of other ingredients are apparent to those skilled in the art to which the invention pertains. The invention furthermore is not limited by any theories advanced by way of explanation of the changes involved in the manufacture of the chemical products set forth but is to be cosidered as limited solely by the following claims wherein I intend to claim all novelty inherent in my invention as is permissible in view of the prior art.

What I claim is:

1. The process of manufacturing vulcanized rubber which comprises combining with rubber a vulcanizing agent in the presence of a small proportion of an accelerating compound formed by combining an organic derivative of ammonia with a product obtained by reacting a mercapto-thiazole compound with a chlorine derivative of carbon disulphide.

2. The process of manufacturing vulcanized rubber which comprises combining with rubber a vulcanizing agent in the presence of a small proportion of an accelerating compound formed by combining an amine with a product obtained by reacting a mercapto-thiazole compound with a chlorine derivative of carbon disulphide.

3. The process of manufacturing vulcanized rubber which comprises combining with rubber a vulcanizing agent in the presence of a small proportion of an accelerating compound formed by combining a secondary amine with a product obtained by reacting a mercapto-thiazole compound with a chlorine derivative of carbon disulphide.

4. The process of manufacturing vulcanized rubber which comprises combining with rubber a vulcanizing agent in the presence of a small proportion of an accelerating compound formed by combining a secondary aliphatic amine with a product obtained by reacting a mercapto-thiazole compound with a chlorine derivative of carbon disulphide.

5. The process of manufacturing vulcanized rubber which comprises combining with rubber a vulcanizing agent in the presence of a small proportion of an accelerating compound formed by combining piperidine with a product obtained by reacting a mercapto-thiazole compound with a chlorine derivative of carbon disulphide.

6. The process of manufacturing vulcanized rubber which comprises combining with rubber a vulcanizing agent in the presence of a small proportion of an accelerating compound formed by combining an organic derivative of ammmonia with a product obtained by reacting a metallic salt of a mercapto-aryl-thiazole with thiophosgene.

7. The process of manufacturing vulcanized rubber which comprises combining with rubber a vulcanizing agent in the presence of a small proportion of an accelerating compound formed by combining an amine with a product obtained by reacting a metallic salt of a mercapto-aryl-thiazole with thiophosgene.

8. The process of manufacturing vulcanized rubber which comprises combining with rubber a vulcanizing agent in the presence of a small proportion of an accelerating compound formed by combining a secondary amine with a product obtained by reacting a metallic salt of a mercapto-aryl-thiazole with thiophosgene.

9. The process of manufacturing vulcanized rubber which comprises combining with rubber a vulcanizing agent in the presence of a small proportion of an accelerating compound formed by combining a secondary aliphatic amine with a product obtained by reacting a metallic salt of a mercapto-aryl-thiazole with thiophosgene.

10. The process of manufacturing vulcanized rubber which comprises combining with rubber a vulcanizing agent in the presence of a small proportion of an accelerating compound formed by combining piperidine with a product obtained by reacting a metallic salt of a mercapto-aryl-thiazole with thiophosgene.

11. The process of manufacturing vulcanized rubber which comprises combining with rubber a vulcanizing agent in the presence of a small proportion of an accelerating compound formed by combining an organic derivative of ammonia with a product obtained by reacting substantially equi-molecular proportions of sodium mercapto-benzo-thiazole with thiophosgene.

12. The process of manufacturing vulcanized rubber which comprises combining with rubber a vulcanizing agent in the presence of a small proportion of an accelerating compound formed by combining an amine with a product obtained by reacting substantially equi-molecular proportions of sodium mercapto-benzo-thiazole with thiophosgene.

13. The process of manufacturing vulcanized rubber which comprises combining with rubber a vulcanizing agent in the presence of a small proportion of an accelerating compound formed by combining a secondary amine with a product obtained by reacting substantially equi-molecular proportions of sodium mercapto-benzo-thiazole with thiophosgene.

14. The process of manufacturing vulcanized rubber which comprises combining with rubber a vulcanizing agent in the presence of a small proportion of an accelerating compound formed by combining a secondary aliphatic amine with a product obtained by reacting substantially equi-molecular proportions of sodium mercapto-benzo-thiazole with thiophosgene.

15. The process of manufacturing vulcanized rubber which comprises combining with rubber a vulcanizing agent in the presence of a small proportion of an accelerating compound formed by combining piperidine with a product obtained by reacting substantially equi-molecular proportions of sodium mercapto-benzo-thiazole with thiophosgene.

16. The process of manufacturing vulcanized rubber which comprises combining with rubber a vulcanizing agent in the presence of a small proportion of an accelerating compound formed by combining substantially equi-molecular proportions of piperidine with di-thiazyl-tri-thiocarbonate.

17. The vulcanized rubber product obtained by treating rubber with a vulcanizing agent in the presence of an accelerator, said accelerator comprising the amine reaction product of the compound formed by combining a mercapto-thiazole with a chlorine derivative of carbon disulphide.

18. The vulcanized rubber product obtained by treating rubber with a vulcanizing agent in the presence of an accelerator, said accelerator comprising the secondary amine reaction product of the compound formed by combining a metallic salt of mercapto-benzo-thiazole with a chlorine derivative of carbon disulphide.

19. The vulcanized rubber product obtained by treating rubber with a vulcanizing agent in the presence of an accelerator, said accelerator comprising the secondary aliphatic amine reaction product of the compound formed by combining sodium mercapto-benzo-thiazole with thiophosgene.

20. The vulcanized rubber product obtained by treating rubber with a vulcanizing agent in the presence of an accelerator, said accelerator comprising the piperidine reaction product of the compound formed by combining sodium mercapto-benzo-thiazole with thiophosgene.

21. The vulcanized rubber product obtained by treating rubber with a vulcanizing agent in the presence of an accelerator, said accelerator comprising the piperidine reaction product of the compound formed by combining substantially equi-molecular proportions of sodium mercapto-benzo-thiazole and thiophosgene.

In testimony whereof I have affixed my signature.

WILLIAM P. ter HORST.